United States Patent [19]

Shibahara

[11] Patent Number: 5,739,886
[45] Date of Patent: Apr. 14, 1998

[54] LIQUID CRYSTAL DISPLAY WITH REVERSE STAGGERED THIN FILM TRANSISTORS AND OPPOSITE ELECTRODE, AND FABRICATION METHOD THEREOF

[75] Inventor: Hideo Shibahara, Tokyo, Japan

[73] Assignee: NEC Corporation, Tokyo, Japan

[21] Appl. No.: 825,814

[22] Filed: Apr. 3, 1997

Related U.S. Application Data

[63] Continuation of Ser. No. 357,287, Dec. 13, 1994, abandoned.

[30] Foreign Application Priority Data

Dec. 20, 1993 [JP] Japan ............................. 5-344931

[51] Int. Cl.[6] ..................................... G02F 1/1343
[52] U.S. Cl. ............................................ 349/139
[58] Field of Search ......................... 359/59, 87, 67; 349/42, 139

[56] References Cited

U.S. PATENT DOCUMENTS

| 4,589,733 | 5/1986 | Yaniv et al. ........................ 359/59 |
| 4,869,576 | 9/1989 | Aoki et al. ........................ 359/59 |
| 5,040,875 | 8/1991 | Noguchi ............................ 359/59 |

FOREIGN PATENT DOCUMENTS

| 0289415 | 11/1988 | European Pat. Off. ........... 359/59 |
| 60-230634 | 11/1985 | Japan ............................. 359/59 |
| 63-53521 | 3/1988 | Japan . |
| 2-163972 | 6/1990 | Japan . |
| 457031 | 2/1992 | Japan ............................. 359/59 |
| 4-367277 | 12/1992 | Japan . |

Primary Examiner—William L. Sikes
Assistant Examiner—James A. Dudek
Attorney, Agent, or Firm—Foley & Lardner

[57] ABSTRACT

A liquid crystal display and its producing method which prevents induction of electrons in a back channel part of a TFT by a positive voltage applied to an opposite electrode formed on a color filter substrate so as to reduce a leakage current in off of the transistor. A TFT substrate and the color film substrate are bonded together via a liquid crystal interposed therebetween. On the TFT substrate, a pixel electrode and the TFT including a gate electrode, a gate insulating film, an a-Si film, an n+ a-Si film, a drain electrode and a source electrode are formed. On the color filter substrate, a color filter and the opposite electrode are formed and an opening is further formed in a part facing to the TFT in the opposite electrode.

7 Claims, 4 Drawing Sheets

LIQUID CRYSTAL DISPLAY WITH REVERSE STAGGERED THIN FILM TRANSISTORS AND OPPOSITE ELECTRODE, AND FABRICATION METHOD THEREOF

This application is a Continuation of application Ser. No. 08/357,287, filed Dec. 13, 1994 now abandoned.

BACKGROUND OF THE INVENTION

The present invention relates to a liquid crystal display with high display quality and a producing method thereof.

DESCRIPTION OF THE RELATED ARTS

An active matrix liquid crystal display using thin film transistors (TFTs) as switching devices is expected to be a flat panel display having display quality equivalent to that of a CRT (cathode ray tube). One of the essential characteristics required for the TFTs used here is a low leakage current in OFF. When the leakage current is much, a pixel electrode voltage charged in ON of the TFT transistor gradually drops to make a different display from the intended content. As a result, inconsistency in displaying is caused to remarkably reduce the display quality.

FIG. 1 is a cross section of a conventional active matrix liquid crystal display of this kind. As shown in FIG. 1, the liquid crystal display is composed of a TFT substrate 110, a color film substrate 220 bonded therewith at a close distance, and a liquid crystal 330 injected between the TFT substrate 110 and the color film substrate 220.

The TFT substrate 110 is produced as follows. That is, a chromium film or the like is deposited on a glass substrate 111 by sputtering and the obtained film is patterned to form a gate electrode 112a. At this time, a scanning wiring 112 (see FIG. 2) is also formed. Next, a silicon nitride film to become a gate insulating film 113, a non-doped amorphous silicon film (hereinafter referred to as "a-Si film") 114 to become an operating layer and a phosphorus (P) doped amorphous silicon film (hereinafter referred to as "n+ a-Si film") 115 for obtaining an ohmic contact are formed on the glass substrate 111 and the amorphous silicon regions 114 and 115 are removed except for the device parts.

Thereafter, a drain wiring 116, a drain electrode 116a and a source electrode 117 are formed by deposition of the chromium film or like and its patterning. Then, a ITO (indium tin oxide) is deposited by sputtering and a pixel electrode 118 connected to the source electrode 117 is prepared by applying a photo-lithography method and a dry etching method. Next, the n+ a-Si film 115 between the drain electrode 116a and the source electrode 117 is removed by etching to separate these electrodes. In order to protect the a-Si film 114 of the back channel part exposed by the etching between the drain electrode 116a and the source electrode 117, a silicon nitride film 119 is coated over the front surface and a part thereof on the pixel electrode 118 is then removed.

On the other hand, a color filter 222 is formed on a glass substrate 221 by a dyeing method or a printing method and ITO is coated on color filter 222 to form an opposite electrode 228, thereby obtaining the color film substrate 220.

Then, the TFT substrate 110 and the color film substrate 220 are bonded together by a seal material layer and after injecting the liquid crystal 330 between these substrates, its injection inlet is sealed using a seal material.

In the liquid crystal display thus constructed, by applying a potential difference between the pixel electrode and the opposite electrode, light transparency is changed to display a picture image.

FIG. 2 is a top plan view of the conventional liquid crystal display and FIG. 1 is the cross section, taken along the line Y—Y in FIG. 2. As shown in FIG. 2, the TFT and the pixel electrode are formed in the area surrounded by the scanning wiring 112 and the drain wiring 116 and the opposite electrode 223 is formed on the color film substrate 220 so as to cover the entire effective pixel surface on the TFT substrate 110.

Usually, a positive voltage of 5 to 10 is applied to the opposite electrode 223. Further, since the opposite electrode 223 is directly over the a-Si film 114 via the liquid crystal 330 as an insulating film and the silicon nitride film 119, electrons are induced on the back channel side (silicon nitride film 119 side) of the a-Si film 114 and leakage current flows in the OFF state of the transistor. As a result, the holding voltage of the pixel electrode 118 is varied to cause an uneven display on the screen.

In order to solve this problem, a variety of proposals have been made as follows.

(1) The TFT and the pixel electrode are covered by a protecting film having a high insulating value to raise the potential of the pixel electrode and the insulating film between the common electrodes. Also, the potential of the common electrodes is determined as the potential for isolating the back gate channel so as to perform an AC drive of the liquid crystal and to control the leakage current (Japanese Patent Laid-Open No. Sho 63-53521).

(2) A p-type layer is formed on the back channel surface of the a-Si film by immersing it in a hydrogen peroxide solution (Japanese Patent Laid-Open No. Hei 2-168972).

(3) After forming a boron (B) doped silicon nitride film as a protecting film for the back channel part, an annealing is carried out to diffuse the boron into the a-Si film to change the back channel interface to the p-type. (Japanese Patent Laid-Open No. Hei 4-867277).

However, in the conventional liquid crystal display shown in FIGS. 1 and 2, the leakage current is caused in the TFT by the capacitive coupling with the opposite electrode to sometimes cause an uneven display. The foregoing proposals have been carried out for dealing with this problem. However, in one proposal, a voltage in a certain direction is applied to the liquid crystal and thus the liquid crystal is degraded in a short time by period. Further, in another proposal, treatment hydrogen peroxide is required. Moreover, in still another proposal, a high temperature treatment cannot be used, so a heat treatment at a low temperature for a relatively long time period is required.

SUMMARY OF THE INVENTION

It is therefore an object of the present invention to provide a liquid crystal display in view of the foregoing problems of the prior art, which is capable of preventing a flow of a leakage current in a back channel part in the off state of a TFT transistor to improve display quality.

It is another object of the present invention to provide a method of producing a liquid crystal display, which is capable of preventing a flow of a leakage current in a back channel part in the off state of a TFT transistor without adding a particular step in a conventional producing method to improve display quality without inviting any cost increase.

In accordance with one aspect of the present invention, there is provided a liquid crystal display, comprising a thin film transistor substrate including a first glass substrate, a plurality of scanning wirings formed on the first glass substrate, a plurality of drain wirings formed perpendicular to the scanning wirings on the first glass substrate, and at least one reverse staggered thin film transistor formed in an area surrounded by the scanning wirings and the drain wirings, the thin film transistor being adjacent a pixel electrode and including, a drain electrode connected to the drain wiring, a gate electrode connected to the scanning wiring and a source electrode connected to the pixel electrode; and a common electrode substrate including a second glass substrate and a common electrode of a transparent conductive film formed on the second glass substrate, at least a part of the common electrode opposite to an active area of the thin film transistor being removed, the thin film transistor substrate and the common electrode substrate being bonded together at a close distance so that the pixel electrode and the common electrode are arranged in opposite positions, a liquid crystal being injected between the thin film transistor substrate and the common electrode substrate.

In accordance with another aspect of the present invention, there is provided a producing method for a liquid crystal display, comprising the steps: producing a pixel electrode on a thin film transistor substrate, including forming a plurality of scanning wirings and a plurality of drain wirings perpendicular to the scanning wirings on a first glass substrate, and forming at least one reverse staggered thin film transistor in an area surrounded by the scanning wirings and the drain wirings, the thin film transistor including, a drain electrode connected to the drain wiring, a gate electrode connected to the scanning wiring and a source electrode connected to the pixel electrode; and a step for producing a common electrode substrate, including forming a common electrode of a transparent conductive film on a second glass substrate, and removing at least a part of the common electrode opposite to an active area of the thin film transistor, the thin film transistor substrate and the common electrode substrate being bonded together at a close distance so that the pixel electrode and the common electrode are arranged in opposite positions, a liquid crystal being injected between the thin film transistor substrate and the common electrode substrate.

The common electrode can be provided with an opening somewhat larger than the active area of the thin film transistor and the opening faces the active area of the thin film transistor.

A data voltage to be applied to the drain wiring can be alternately changeable to either positive or negative data voltages and a voltage near the middle of either positive or negative data voltages can be applied to the common electrode.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
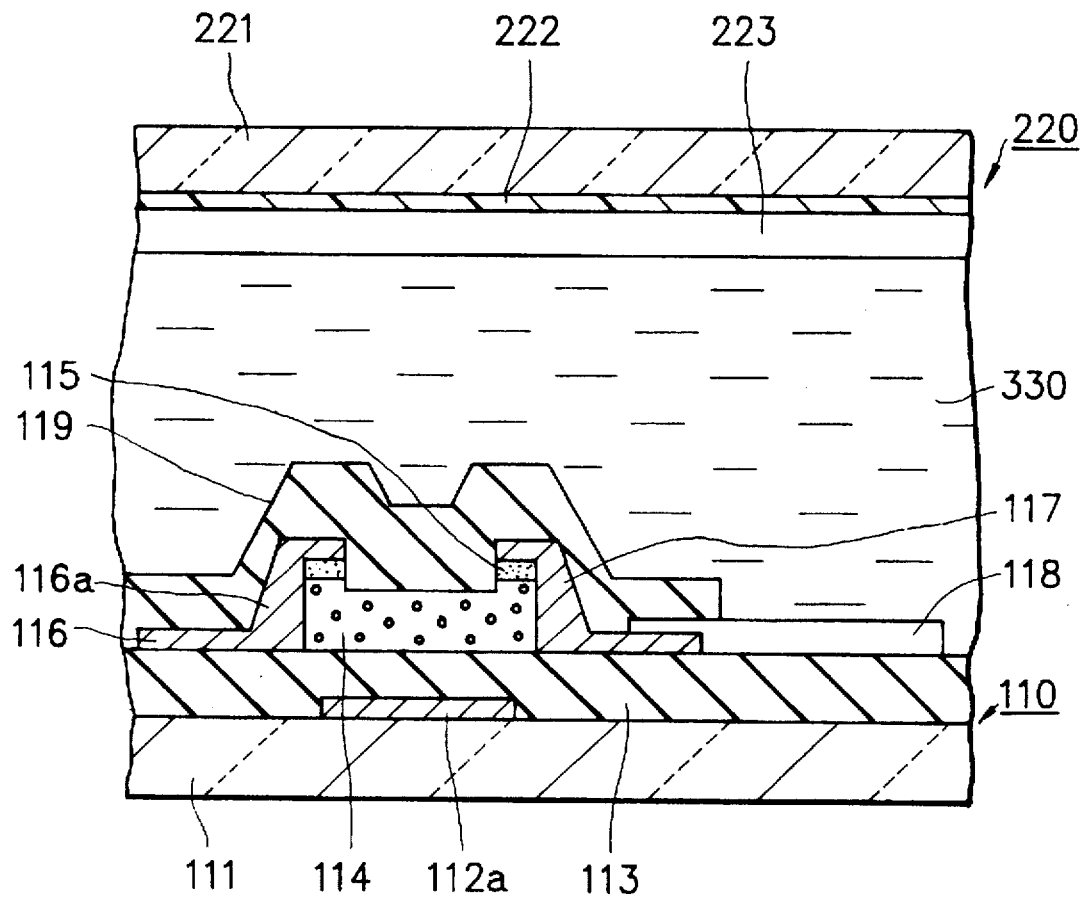
FIG. 1 is a cross sectional view of a conventional liquid crystal display.
Figure 2:
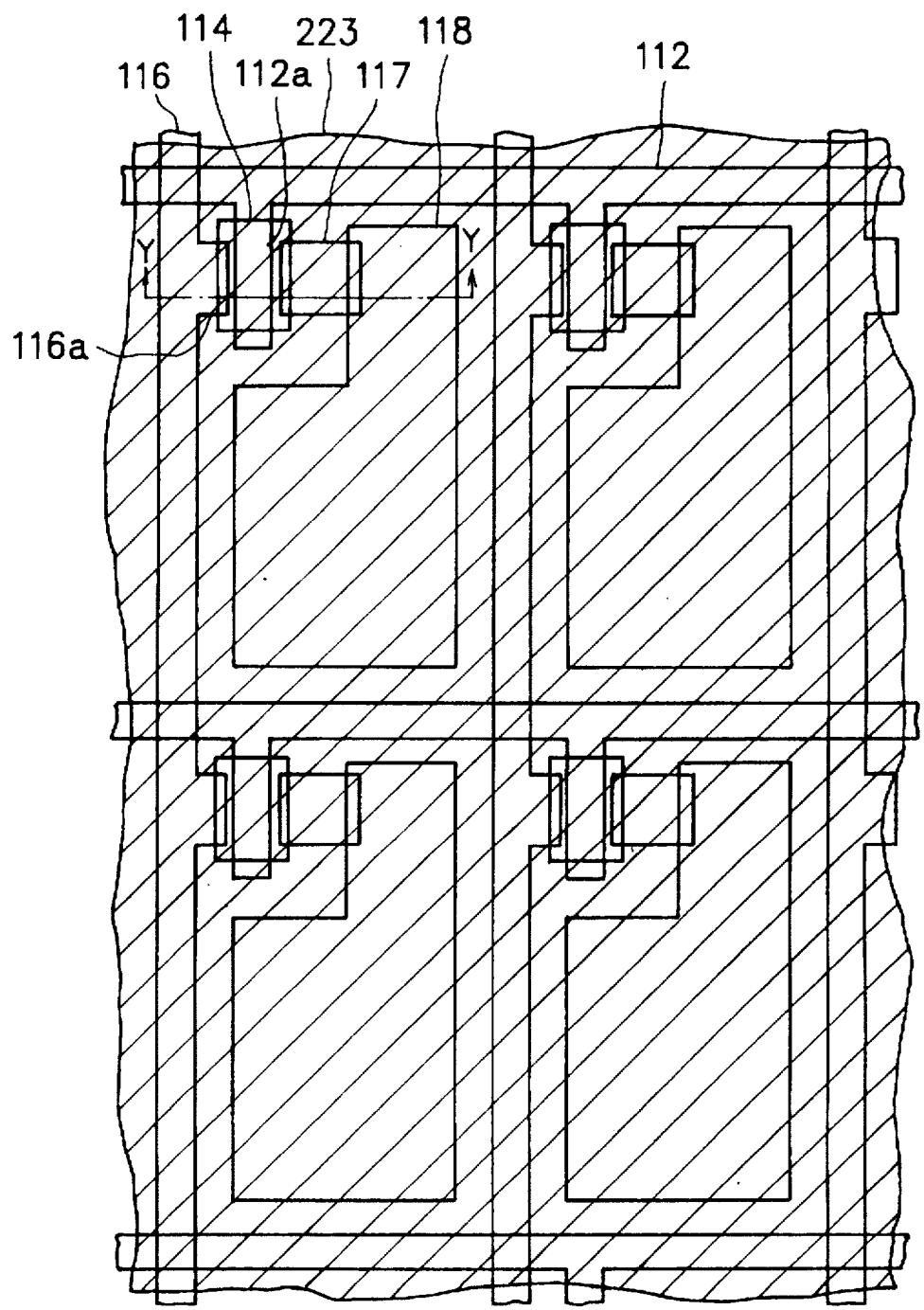
FIG. 2 is a top plan view of the conventional liquid crystal display including the one shown in FIG. 1.
Figure 3:
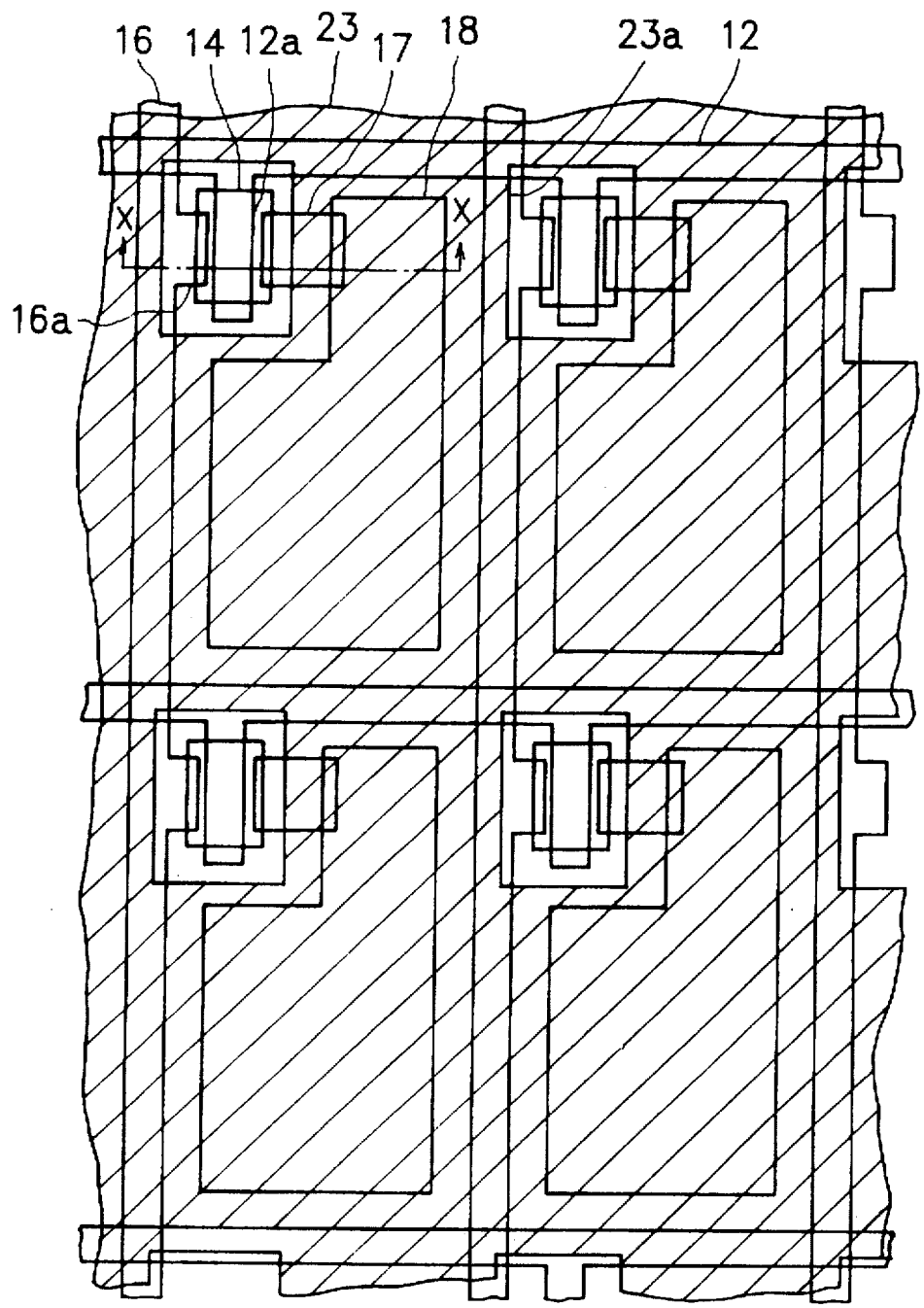
FIG. 3 is a top plan view of one embodiment of a liquid crystal display according to the present invention.
Figure 4:
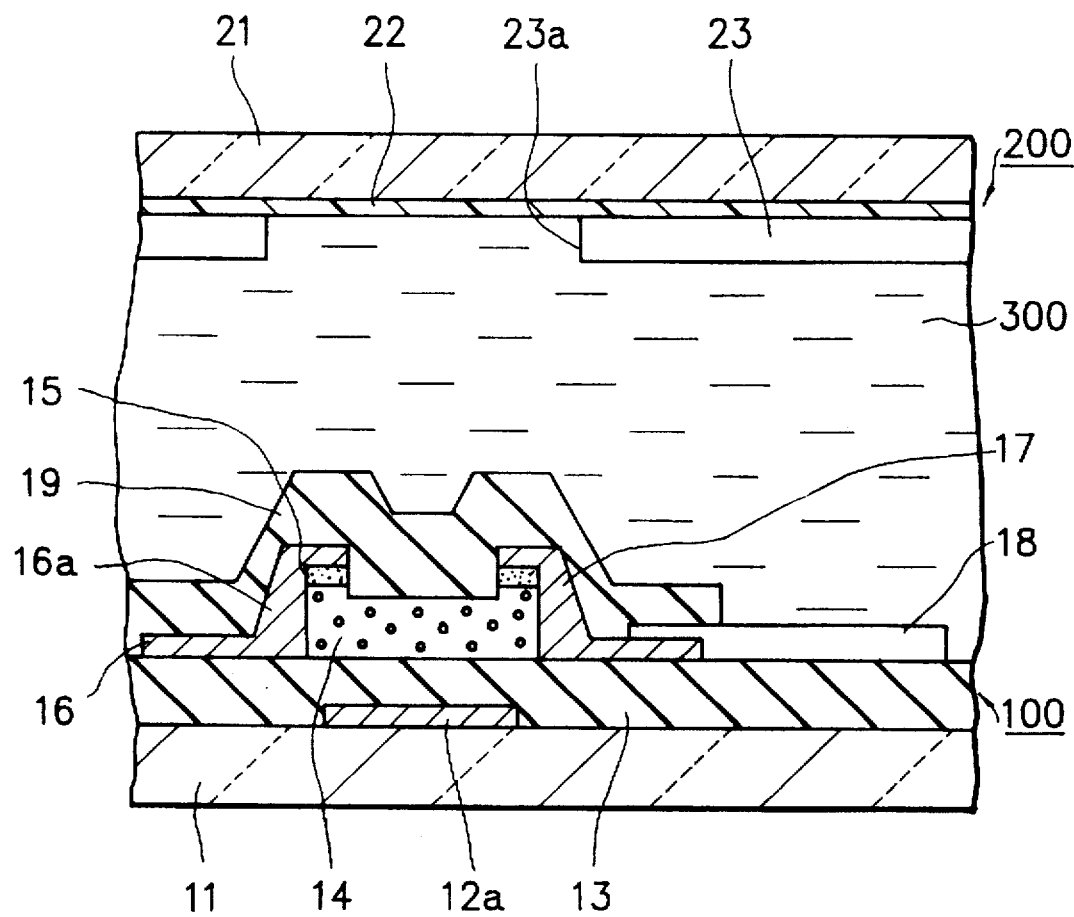
FIG. 4 is a cross sectional view, taken along the line X—X shown in FIG. 3.

Referring now to the drawings, wherein like reference characters designate like or corresponding parts throughout the views and thus the repeated description thereof can be omitted for brevity, there is shown in FIGS. 3 and 4 one embodiment of a liquid crystal display according to the present invention.

As shown in FIG. 3, in the liquid crystal display, scanning or gate wirings 12 run in the horizontal direction and data or drain wirings 16 run in the vertical direction. A plurality of gate electrodes 12a are connected to the scanning wirings 12 and a plurality of drain electrodes 16a are connected to the drain wirings 16. The gate electrodes 12a are formed integrally with the gate wirings 12 at the same time and the drain electrodes 16a are formed integrally with the drain wirings 16 at the same time.

In this embodiment, an non-doped a-Si (amorphous silicon) film 14 is formed above the gate electrode 12a separated via a gate insulating film 13 and connected to a drain electrode 16a and a source electrode 17. The other end of the source electrode 17 is coupled to a pixel electrode 18. In this embodiment, an opposite electrode 23 covers over the pixel area of a TFT substrate and an opening 23a is formed in a part above the TFT in the opposite electrode 23.

FIG. 4 is a cross section of the active matrix liquid crystal display according to the present invention. As shown in FIG. 4, the liquid crystal display is composed of a TFT substrate 100, a color film substrate 200 bonded therewith at a close distance, and a liquid crystal 300 injected between the TFT substrate 100 and the color film substrate 200.

The TFT substrate 100 is produced as follows. That is, a chromium film or the like is deposited on a glass substrate 11 by sputtering and the obtained film is patterned to form the gate electrode 12a. At this time, the scanning wiring 12 (see FIG. 3) is also formed. Next, a silicon nitride film to become the gate insulating film 13, the non-doped a-Si film 14 to become an operating layer and a phosphorus (P) doped amorphous silicon film (hereinafter referred to as "n+ a-Si film") 15 for obtaining an ohmic contact are formed on the glass substrate 11 by a plasma CVD (chemical vapor deposition) method and the amorphous silicons layer 14 and 15 are except removed for the device part.

Thereafter, the drain wiring 16, the drain electrode 16a and the source electrode 17 are formed by a deposition of the chromium film or the like and its patterning. Then, ITO is deposited by sputtering and the pixel electrode 18 connected to the source electrode 17 is prepared by applying a photolithography method and a dry etching method. Next, the n+ a-Si film 15 between the drain electrode 16a and the source electrode 17 is removed by etching to separate these electrodes. In order to protect the a-Si film 14 at the back channel part exposed by the etching between the drain electrode 16a and the source electrode 17, a silicon nitride film 19 is coated over the front surface and a part thereof on the pixel electrode 18 is then removed.

On the other hand, a color filter 22 is formed on a glass substrate 21 by a dyeing method or a printing method, and ITO is coated on the color filter 22 to form the opposite electrode 23, and the opening 23a is further formed in the part opposite to the TFT in the opposite electrode 23, thereby obtaining the color film substrate 200.

Then, the TFT substrate 100 and the color film substrate 200 are bonded together by a seal material layer (adhesive layer) and after injecting the liquid crystal 300 between these substrates, its injection inlet is sealed using a seal material.

In the liquid crystal display thus constructed, by applying a potential difference between the pixel electrode and the opposite electrode, light transparency is changed to display a picture image. The drain wiring acts as a data line and has applied thereto a data voltage which alternately changes to positive or negative data voltages. A voltage near the middle of these positive or negative data voltages is applied to the common electrode.

In this embodiment, since the opening 23a of the opposite electrode 23 can be formed at the same time when the external shape of the opposite electrode 23 is patterned, the liquid crystal display of the present invention can be produced without adding any particular step to the conventional producing process.

In the liquid crystal display of the present invention, as described above, since the opposite electrode 23 is not present above the thin film transistor, the capacitive coupling between the opposite electrode 23 and the thin film transistor is weak and, even when a positive voltage of 5 to 10 V is applied to the opposite electrode 23, no electron is induced in the back channel part of the a-Si film 14. Hence, no channel is formed in the back channel part of the a-Si film 14 in the off state of the transistor and the voltage drop of the pixel electrode can be prevented.

Further, in this embodiment, different from one conventional case of Japanese Patent Laid-Open No. Sho 63-53521, no negative high voltage is applied to the opposite electrode and a voltage to be applied to the opposite electrode is determined to be a value near the middle of a video signal voltage. As a result, a DC voltage is not applied to the liquid crystal for a long time, resulting in preventing of the liquid crystal from deterioration.

Although the present invention has been described in its preferred embodiments with reference to the accompanying drawings, it readily understood that the present invention is not restricted to the preferred embodiments and hence various changes and modifications can be made by those skilled in the art within and scope of the present invention as specified in the appended claims. For example, although the opening is formed in the part above the thin film transistor in the opposite electrode in the foregoing embodiment, the opposite electrode can be formed in only the part corresponding to the pixel electrode instead and be connected thereto by a connection conductor.

As described above, in the liquid crystal display of the present invention, since the opening is provided in the part above the thin film transistor in the opposite electrode, even when positive voltage is applied to the opposite electrode, no electron is induced in the back channel part of the a-Si film. Hence, according to the present invention, leakage current can be prevented in the off state of the thin film transistor and thus the drop of the pixel electrode voltage and the occurrence of the uneven display caused thereby can be prevented. As a result, the display image with high quality can be obtained.

Further, according to the present invention, since no particular step is added to the conventional production method of the liquid crystal display, the above effects can be enjoyed without inviting any cost increase.

What is claimed is:

1. A liquid crystal display, comprising:
a pair of scan lines;
a pair of data lines extending in a perpendicular direction to the scan lines so that a pixel region is defined by the scan lines and the data lines;
a pixel electrode formed in the pixel region;
a reverse staggered thin film transistor formed in the pixel region, the reverse staggered thin film transistor having a gate thereof connected to a corresponding one of the scan lines, a drain thereof connected to a corresponding one of the data lines and a source thereof connected to the pixel electrode;
a common opposite electrode opposing the pixel electrode;and
a liquid crystal region disposed between the common opposite electrode and the pixel electrode;
the common opposite electrode having an opening formed so that an active region of the reverse staggered thin film transistor faces the opening of the common opposite electrode;
the common opposite electrode extending over a substantial portion of the scan lines and data lines and the opening not extending over the substantial portion of the scan lines and data lines.

2. The liquid crystal display as claimed in claim 1, wherein
the active region of the reverse staggered thin film transistor comprises a channel region formed between the drain and the source thereof; and
the opening of the common opposite electrode has a larger area than the channel region of the reverse staggered thin film transistor.

3. The liquid crystal display as claimed in claim 1, wherein:
the corresponding one of the data lines is supplied with an data voltage alternately changing between a positive level and a negative level; and
the common opposite electrode is supplied with a voltage substantially equivalent to a middle level between the positive level and the negative level.

4. A fabrication method for a liquid crystal display, comprising the steps of:
forming a pair of scan lines and a pair of data lines extending in a perpendicular direction to the scan lines so that a pixel region is defined by the scan lines and the data lines;
forming a pixel electrode in the pixel region;
forming a reverse staggered thin film transistor in the pixel region, the reverse staggered thin film transistor having a gate thereof connected to a corresponding one of the scan lines, a drain thereof connected to a corresponding one of the data lines and a source thereof connected to the pixel electrode;
forming a common opposite electrode opposing the pixel electrode and extending over all the scan lines and data lines;
forming an opening through the common opposite electrode located so that an active region of the reverse staggered thin film transistor faces the opening of the common opposite electrode and the common opposite electrode extends over a substantial portion of the scan lines and data lines and the opening does not extend over the substantial portion of the scan lines and data lines; and
injecting a volume of liquid crystal between the pixel electrode and the common opposite electrode.

5. The method as claimed in claim 4, wherein the opening through the common opposite electrode is somewhat larger than the active region of the thin film transistor and the opening faces the active region of the thin film transistor.

6. A liquid crystal display, comprising:
a pair of scan lines;

a pair of data lines extending in a substantially perpendicular direction with respect to the scan lines so that a pixel region is defined by the scan lines and the data lines;

a pixel electrode formed in the pixel region;

a reverse staggered thin film transistor formed in the pixel region, the reverse staggered thin film transistor having a gate electrode connected to a corresponding one of the scan lines, a drain electrode connected to a corresponding one of the data lines, and a source electrode connected to the pixel electrode;

a liquid crystal region; and a common opposite electrode which opposes the pixel electrode with the liquid crystal region situated therebetween, the common opposite electrode having an opening formed so that an active region of the reverse staggered thin film transistor faces the opening of the common opposite electrode, the opening not extending over a substantial area of the scan lines and data lines and the common opposite electrode having a remaining portion extending substantially over all the scan lines and data lines.

7. The liquid crystal display as claimed in claim 6, further comprising:

a color film substrate including;

a color filter located on a surface of the common opposite electrode; and a glass substrate located on the color filter such that the color filter is situated between the glass substrate and the common opposite electrode.

* * * * *